(12) United States Patent
Ehrlich et al.

(10) Patent No.: US 7,440,224 B2
(45) Date of Patent: Oct. 21, 2008

(54) DISK DRIVE SERVO

(75) Inventors: Richard M. Ehrlich, Saratoga, CA (US); David Rutherford, San Jose, CA (US)

(73) Assignee: Toshiba Corporation, Tokyo (JP)

( * ) Notice: Subject to any disclaimer, the term of this patent is extended or adjusted under 35 U.S.C. 154(b) by 163 days.

(21) Appl. No.: 11/338,359

(22) Filed: Jan. 23, 2006

(65) Prior Publication Data

US 2007/0171564 A1    Jul. 26, 2007

(51) Int. Cl.
G11B 5/596   (2006.01)
G11B 21/02   (2006.01)

(52) U.S. Cl. .................... 360/77.08; 360/75

(58) Field of Classification Search .............. None
See application file for complete search history.

(56) References Cited

U.S. PATENT DOCUMENTS

| | | | |
|---|---|---|---|
| 4,549,232 A | 10/1985 | Axmear |
| 4,614,986 A | 9/1986 | La Budde |
| 4,706,250 A | 11/1987 | Patel |
| 4,811,124 A | 3/1989 | Dujari et al. |
| 4,829,249 A | 5/1989 | Matsushita et al. |
| 4,833,679 A | 5/1989 | Anderson et al. |
| 4,881,136 A | 11/1989 | Shiraishi et al. |
| 4,993,029 A | 2/1991 | Galbraith et al. |
| 5,068,858 A | 11/1991 | Blaum et al. |
| 5,109,304 A | 4/1992 | Pederson |
| 5,150,050 A | 9/1992 | Genheimer et al. |
| 5,267,241 A | 11/1993 | Kowal |
| 5,339,204 A | 8/1994 | James et al. |
| 5,424,638 A | 6/1995 | Huber |
| 5,444,719 A | 8/1995 | Cox et al. |
| 5,455,536 A | 10/1995 | Kono et al. |
| 5,487,077 A | 1/1996 | Hassner et al. |

(Continued)

FOREIGN PATENT DOCUMENTS

EP    769774    4/1997

(Continued)

OTHER PUBLICATIONS

Al Mamun, A., et al., "Efficient position encoding in hard disk drive using dual frequency servo bursts", *The 27th Annual Conference of the IEEE Industrial Electronics Society*, 2001. IECON '01. vol. 1, (2001),609-614.

(Continued)

*Primary Examiner*—Andrew L. Sniezek
(74) *Attorney, Agent, or Firm*—Schwegman, Lundberg & Woessner, P.A.

(57) ABSTRACT

A disk drive includes a disk having a first servo burst written with advancing phase as a radial distance on the disk increases, and a second servo burst written with decreasing phase as a radial distance on the disk increases, and a transducing head, and a read channel. The disk drive also includes an element for shifting the phase of the signal produced by the first burst pattern with respect to the signal produced by the second burst pattern by an amount sufficient to substantially cancel distortion in a signal produced by the first servo burst with distortion in a signal produced by the second servo burst when the signal from the first servo burst is added to the signal from the second servo burst.

16 Claims, 11 Drawing Sheets

U.S. PATENT DOCUMENTS

| | | | |
|---|---|---|---|
| 5,532,586 | A | 7/1996 | Ishikawa |
| 5,563,746 | A | 10/1996 | Bliss |
| 5,568,331 | A | 10/1996 | Akagi et al. |
| 5,615,064 | A | 3/1997 | Blank et al. |
| 5,659,436 | A | 8/1997 | Yarmchuk et al. |
| 5,663,846 | A | 9/1997 | Masuoka et al. |
| 5,751,947 | A | 5/1998 | Arakawa |
| 5,781,363 | A | 7/1998 | Rowan et al. |
| 5,792,947 | A | 8/1998 | Pogrebinsky et al. |
| 5,815,338 | A | 9/1998 | Tsunekawa et al. |
| 5,867,341 | A | 2/1999 | Volz et al. |
| 6,057,926 | A | 5/2000 | Horai |
| 6,081,112 | A | 6/2000 | Carobolante et al. |
| 6,091,564 | A | 7/2000 | Codilian et al. |
| 6,101,227 | A | 8/2000 | Glover |
| 6,175,459 | B1 | 1/2001 | Tomita |
| 6,195,220 | B1 | 2/2001 | Ellis et al. |
| 6,198,584 | B1 | 3/2001 | Codilian et al. |
| 6,204,629 | B1 | 3/2001 | Rote et al. |
| 6,204,989 | B1 | 3/2001 | Hryina et al. |
| 6,219,814 | B1 | 4/2001 | Coker et al. |
| 6,243,224 | B1 | 6/2001 | Sacks et al. |
| 6,259,576 | B1 | 7/2001 | Ahn |
| 6,292,316 | B1 | 9/2001 | Dietzel et al. |
| 6,292,913 | B1 | 9/2001 | Son |
| 6,363,214 | B1 | 3/2002 | Merello et al. |
| 6,411,459 | B1 | 6/2002 | Belser et al. |
| 6,429,995 | B1 | 8/2002 | Dobbek et al. |
| 6,469,849 | B1 | 10/2002 | Ellis et al. |
| 6,490,111 | B1 | 12/2002 | Sacks |
| 6,519,107 | B1 | 2/2003 | Ehrlich et al. |
| 6,522,488 | B2 | 2/2003 | Sasamoto et al. |
| 6,608,477 | B2 | 8/2003 | Sacks et al. |
| 6,631,046 | B2 | 10/2003 | Szita et al. |
| 6,643,082 | B1 | 11/2003 | Belser |
| 6,651,213 | B2 | 11/2003 | Hassner et al. |
| 6,704,156 | B1 | 3/2004 | Baker et al. |
| 6,760,179 | B2 | 7/2004 | Moon et al. |
| 6,760,184 | B1 | 7/2004 | Cunningham |
| 6,785,075 | B2 | 8/2004 | Bryant et al. |
| 6,785,084 | B2 | 8/2004 | Szita |
| 6,885,514 | B1 | 4/2005 | Codilian et al. |
| 6,906,884 | B2 | 6/2005 | Yasuna |
| 6,940,679 | B1 | 9/2005 | McNeil et al. |
| 6,943,977 | B2 | 9/2005 | Yatsu |
| 6,961,203 | B1 | 11/2005 | Baker |
| 7,023,631 | B2 | 4/2006 | Zhang et al. |
| 2001/0019463 | A1 | 9/2001 | Drouin |
| 2002/0141101 | A1 | 10/2002 | Brittner et al. |
| 2003/0065469 | A1 | 4/2003 | Pedrazzini et al. |
| 2003/0161065 | A1 | 8/2003 | Yatsu |
| 2003/0179482 | A1 | 9/2003 | Fukushima |
| 2003/0189781 | A1 | 10/2003 | Dunn |
| 2003/0214747 | A1 | 11/2003 | Baral |
| 2004/0061968 | A1 | 4/2004 | Fukushima et al. |
| 2004/0075935 | A1 | 4/2004 | Yatsu |
| 2004/0114270 | A1 | 6/2004 | Chung et al. |
| 2004/0123025 | A1 | 6/2004 | Chainer et al. |
| 2004/0145825 | A1 | 7/2004 | Miles |
| 2004/0201914 | A1 | 10/2004 | Ikeda et al. |
| 2004/0264019 | A1 | 12/2004 | Curtiss et al. |
| 2004/0264031 | A1 | 12/2004 | Yatsu |
| 2005/0013037 | A1 | 1/2005 | Tanner |
| 2005/0052767 | A1 | 3/2005 | Miyata |
| 2005/0073770 | A1 | 4/2005 | Ehrlich et al. |
| 2005/0078403 | A1 | 4/2005 | Mizukoshi |
| 2005/0082996 | A1 | 4/2005 | Luebbe |
| 2005/0099720 | A1 | 5/2005 | Chung |
| 2005/0117240 | A1 | 6/2005 | Codilian et al. |
| 2005/0117245 | A1 | 6/2005 | Park et al. |
| 2005/0152058 | A1 | 7/2005 | Schmidt |
| 2005/0174679 | A1 | 8/2005 | Chan et al. |
| 2005/0207051 | A1 | 9/2005 | Fukushima |
| 2005/0218853 | A1 | 10/2005 | Kokami |
| 2005/0237646 | A1 | 10/2005 | Ehrlich |
| 2005/0237653 | A1 | 10/2005 | Ehrlich |
| 2005/0237656 | A1 | 10/2005 | Ehrlich |
| 2005/0237658 | A1 | 10/2005 | Ehrlich |
| 2005/0237659 | A1 | 10/2005 | Ehrlich |
| 2005/0248872 | A1 | 11/2005 | Ehrlich |
| 2006/0132962 | A1* | 6/2006 | Ehrlich et al. ................. 360/75 |

FOREIGN PATENT DOCUMENTS

| | | |
|---|---|---|
| EP | 962915 | 12/1999 |
| GB | 2361576 | 10/2001 |
| JP | 62188015 | 8/1987 |
| JP | 63211116 | 9/1988 |
| JP | 3214474 | 9/1991 |
| JP | 2001014816 | 1/2001 |
| JP | 2002288956 | 10/2002 |
| JP | 2005352536 | 12/2002 |
| JP | 2003-008590 | 1/2003 |
| JP | 2003085904 | 3/2003 |
| JP | 2005174429 | 6/2005 |
| JP | 2005190509 | 7/2005 |
| WO | WO-9741558 | 11/1997 |

OTHER PUBLICATIONS

Al Mamun, A., et al., "Measurement of position offset in hard disk drive using dual frequency servo bursts", *IEEE Transactions on Instrumentation and Measurement*, 52(6), (2003), 1870-1880.

Gurumurthi, Sudhanva, et al., "DRPM: Dynamic Speed Control for Power Management in Server Class Disks", *Proceedings of the 30th Annual International Symposium on Computer Architecture*, (2003), 169-181.

Hughes, E C., et al., "Characterization of three servo patterns for position error signal generation in hard drives", *Proceedings of the 2003 American Control Conference*, (Jun. 2003),4317-4322.

Matsuoka, Kaoru, "Servo track writing of HDDs using magnetic printing technology", *JSME News*, 16(1);, The Japan Society of Mechanical Engineers, (2005),1-10.

Sacks, Alexei, "Positive error signal generation in magnetic disk drives", *(Presentation)—PhD Thesis of Alexei Sacks* Carnegie-Mellon University, (1995),1-37.

Schultz, M D., et al., "A self-servowrite clocking process", *IEEE Transactions on Magnetics*, 37(4), (Jul. 2001),1878-1880.

Sereinig, W., "Motion control: the power side of disk drives", *Proceedings of the International Conference on Computer Design: VLSI in Computers & Processors*, (2001),1-6.

Takaishi, K., et al., "Hard disk drive servo technology for media-level servo track writing", *IEEE Transactions on Magnetics*, 39(2); (Mar. 2003),851-856.

Ye, Haibei, et al., "Radial error propagation issues in self-servo track writing technology", *IEEE Transactions on Magnetics*, 38(5); (Sep. 2002),2180-2182.

\* cited by examiner

DISK DRIVE SERVO

TECHNICAL FIELD

A disk drive is an information storage device. A disk drive includes one or more disks clamped to a rotating spindle, and at least one head for reading information representing data from and/or writing data to the surfaces of each disk. More specifically, storing data includes writing information representing data to portions of tracks on a disk. Data retrieval includes reading the information representing data from the portion of the track on which the information representing data was stored. Disk drives also include an actuator utilizing linear or rotary motion for positioning transducing head(s) over selected data tracks on the disk(s). A rotary actuator couples a slider, on which a transducing head is attached or integrally formed, to a pivot point that allows the transducing head to sweep across a surface of a rotating disk. The rotary actuator is driven by a voice coil motor.

Disk drive information storage devices employ a control system for controlling the position the transducing head during read operations, write operations and seeks. The control system includes a servo control system or servo loop. The function of the head positioning servo control system within the disk drive information storage device is two-fold: first, to position the read/write transducing head over a data track with sufficient accuracy to enable reading and writing of that track without error; and, second, to position the write element with sufficient accuracy not to encroach upon adjacent tracks to prevent data erosion from those tracks during writing operations to the track being followed.

A servo control system includes a written pattern on the surface of a disk called a servo pattern. The servo pattern is read by the transducing head. Reading the servo pattern results in positioning data or a servo signal used to determine the position of the transducing head with respect to a track on the disk. In one servo scheme, positioning data can be included in servo wedges, each including servo patterns. Information included in the servo patterns can be used to generate a position error signal (PES) that indicates the deviation of the transducing head from a desired track center. The PES is also used as feedback in the control system to provide a signal to the voice coil motor of the actuator to either maintain the position of the transducing head over a desired track centerline or to reposition the transducing head to a position over the centerline of a desired track.

Attempts have been made to linearize a disk drive PES signal via post-processing of a raw PES signal. A linearized PES is sensitive to the exact amount of distortion in the raw signal. Distortion can be caused by any number of conditions. For example, distortion from the third harmonic of the raw PES can change with the environmental conditions of the disk drive, the age of the transducing head, or with a small change in the fly-height of the transducing head with respect to the surface of the disk. Other conditions can also affect the third harmonic or produce other distortions in the raw PES. For example, environmental conditions, such as temperature, ambient air-pressure, can result in distortion.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

The description set out herein illustrates the various embodiments of the invention and such description is not intended to be construed as limiting in any manner.

DETAILED DESCRIPTION

Figure 1:
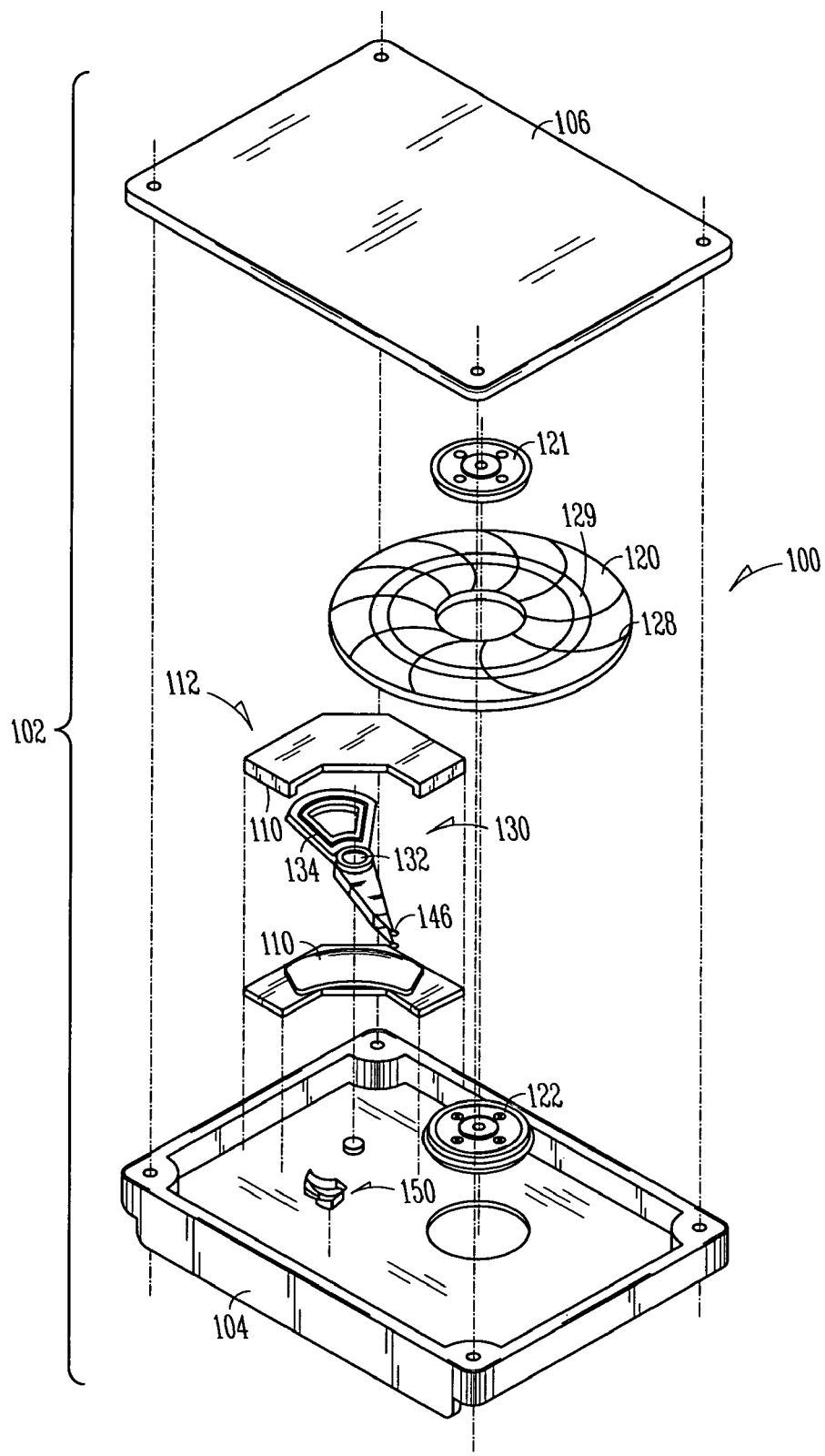
FIG. 1 is an exploded view of a disk drive that uses example embodiments described herein.

FIG. 1 is an exploded view of disk drive 100 that uses various embodiments of the present invention. The disk drive 100 includes a housing 102 including a housing base 104 and a housing cover 106. The housing base 104 illustrated is a base casting, but in other embodiments a housing base 104 can comprise separate components assembled prior to, or during assembly of the disk drive 100. A disk 120 is attached to a hub or spindle 122 that is rotated by a spindle motor. The disk 120 can be attached to the hub or spindle 122 by a clamp 121. The disk may be rotated at a constant or varying rate ranging from less than 3,600 to more than 15,000 revolutions per minute. Higher rotational speeds are contemplated in the future. The spindle motor is connected with the housing base 104. The disk 120 can be made of a light aluminum alloy, ceramic/glass or other suitable substrate, with magnetizable material deposited on one or both sides of the disk. The magnetic layer includes small domains of magnetization for storing data transferred through a transducing head 146. The transducing head 146 includes a magnetic transducer adapted to read data from and write data to the disk 120. In other embodiments, the transducing head 146 includes a separate read element and write element. For example, the separate read element can be a magneto-resistive head, also known as a MR head. It will be understood that multiple head 146 configurations can be used.

A rotary actuator 130 is pivotally mounted to the housing base 104 by a bearing 132 and sweeps an arc between an inner diameter (ID) of the disk 120 and a ramp 150 positioned near an outer diameter (OD) of the disk 120. Attached to the housing 104 are upper and lower magnet return plates 110 and at least one magnet that together form the stationary portion of a voice coil motor (VCM) 112. A voice coil 134 is mounted to the rotary actuator 130 and positioned in an air gap of the VCM 112. The rotary actuator 130 pivots about the bearing 132 when current is passed through the voice coil 134 and pivots in an opposite direction when the current is reversed, allowing for control of the position of the actuator 130 and the attached transducing head 146 with respect to the disk 120. The VCM 112 is coupled with a servo system (shown in FIG. 4) that uses positioning data read by the transducing head 146 from the disk 120 to determine the position of the head 146 over one of a plurality of tracks on the disk 120. The servo system determines an appropriate current to drive through the voice coil 134, and drives the current through the voice coil 134 using a current driver and associated circuitry (not shown in FIG. 1).

Each side of a disk 120 can have an associated head 146, and the heads 146 are collectively coupled to the rotary actuator 130 such that the heads 146 pivot in unison. The invention described herein is equally applicable to devices wherein the individual heads separately move some small distance relative to the actuator. This technology is referred to as dual-stage actuation (DSA).

One type of servo system is an embedded, servo system in which tracks on each disk surface used to store information representing data contain small segments of servo information. The servo information, in some embodiments, is stored in radial servo sectors or servo wedges shown as several harrow, somewhat curved spokes 128 substantially equally spaced around the circumference of the disk 120. It should be noted that in actuality there may be many more servo wedges than as shown in FIG. 1. The servo wedges 128 are further detailed in FIGS. 2 and 7 and in the discussions associated with those FIGS.

The disk 120 also includes a plurality of tracks on each disk surface. The plurality of tracks is depicted by two tracks, such as track 129 on the surface of the disk 120. The servo wedges 128 traverse the plurality of tracks, such as track 129, on the disk 120. The plurality of tracks, in some embodiments, may be arranged as a set of substantially concentric circles. Data is stored in fixed sectors along a track between the embedded servo wedges 128. The tracks on the disk 120 each include a plurality of data sectors. More specifically, a data sector is a portion of a track having a fixed block length and a fixed data storage capacity (e.g. 512 bytes of user data per data sector). The tracks toward the inside of the disk 120 are not as long as the tracks toward the periphery of the disk 110. As a result, the tracks toward the inside of the disk 120 can not hold as many data sectors as the tracks toward the periphery of the disk 120. Tracks that are capable of holding the same number of data sectors are grouped into a data zones. Since the density and data rates vary from data zone to data zone, the servo wedges 128 may interrupt and split up at least some of the data sectors. The servo sectors 128 are typically recorded with a servo writing apparatus at the factory (called a servo-writer), but may be written (or partially written) with the disk drive's 100 transducing head 146 in a self-servowriting operation.

Figure 2:
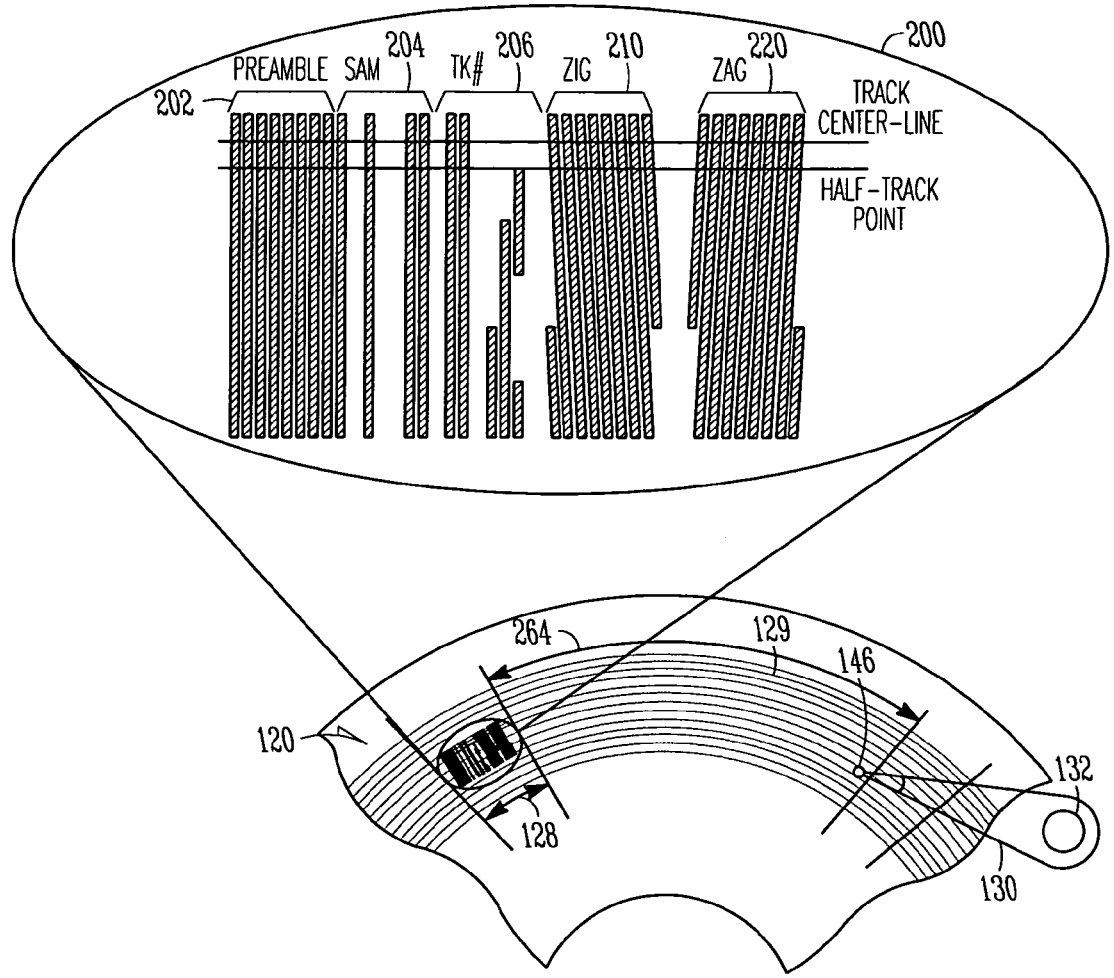
FIG. 2 is a partial detailed view of a disk from the disk drive shown in FIG. 1 that includes a first servo pattern, according to an example embodiment.

FIG. 2 shows a portion of a disk 120 having at least one servo wedge 128. Each servo wedge 128 includes information stored as regions of magnetization or other indicia, such as optical indicia. A servo wedge 128 can be longitudinally magnetized (for example, in the magnified portion of FIG. 2 a servo pattern 200 includes cross-hatched blocks magnetized to the left and white spaces magnetized to the right, or vice-versa) or alternatively perpendicularly magnetized (e.g., the cross-hatched blocks are magnetized up and the white spaces are magnetized down, or vice-versa). Servo patterns 200 contained in each servo wedge 128 are read by the transducing head 146 as the surface of the spinning disk 120 passes under the transducing head 146. The servo patterns 200 can include information identifying a data sector contained in a data field 264. For example, the servo pattern 200 can include digital information such as a preamble 202, a servo address mark (SAM) 204, a track identification number 206. The servo pattern 200 may also include a first phase burst servo pattern 210 and a second phase burst servo pattern 220 that can be used to generate a position error signal (PES) to correct deviations of the transducing head 146 with respect to the center of a track 129.

In some embodiments, the servo wedge 120 will also include other information such as a wedge number. This can be a single bit to designate an index wedge (wedge #0), or the SAM may be replaced by another pattern (referred to as a servo index mark or SIM), or the wedge may contain a few low-order bits of the wedge number or a complete wedge number.

The magnified portion of FIG. 2 illustrates one example servo pattern 200 that includes a first phase burst 210 in which the phases of the signals written to the disk advance in phase as the radial distance increases. The first phase burst 210 may also be referred to as a zig pattern or referred to as burst A. The magnified portion also includes a second phase burst 220 in which the phases of the signals written to the disk decrease or fall back in phase as the radial distance increases. The second phase burst 220 may also be referred to as a zag pattern or referred to as burst B. The magnified portion of FIG. 2 illustrates one example servo pattern in which the first servo burst 210 is written in phase with the second servo burst 220.

Figure 3:
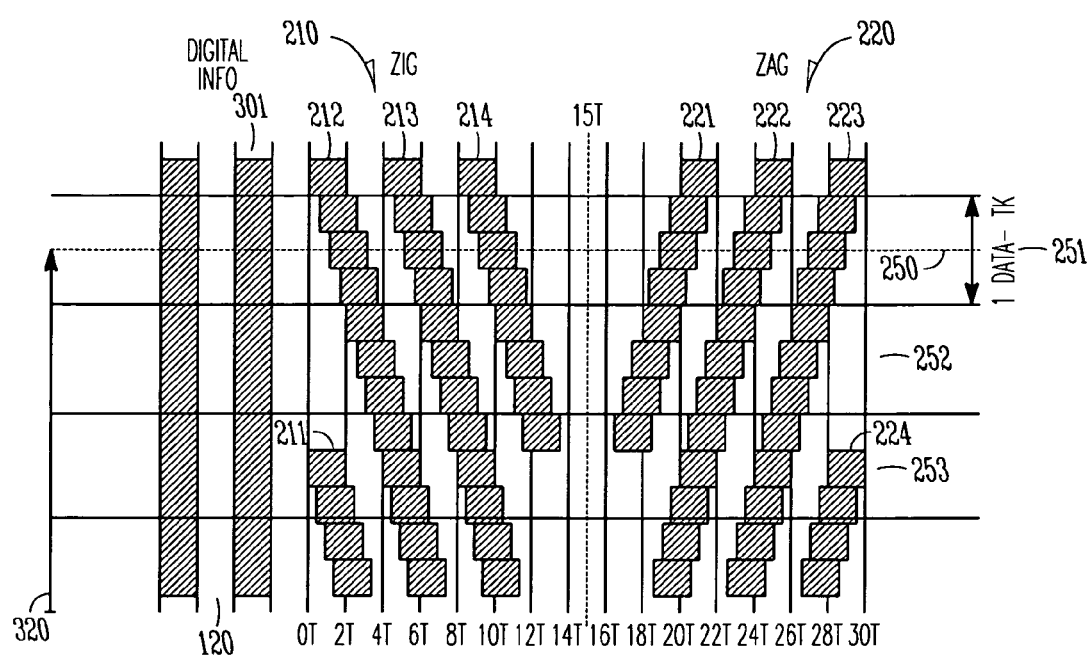
FIG. 3 is a representation of a servo signal that includes a first phase servo burst that is written in phase with a second phase servo burst, according to an example embodiment.

FIG. 3 is a representation of a servo signal that includes a first phase servo burst 210 that is written in phase with a second phase servo burst 220, according to an example embodiment. FIG. 3 is a more detailed view of the servo patterns from the first servo burst 210 and the second servo burst 220. Therefore most of the discussion will be about the first servo burst 210 and the second servo burst 220. As shown in FIG. 3, the information in the servo area before the servo burst is designated as digital info 301. The digital info 301 would include the preamble 202, the SAM 204, and the track number 206 (shown in FIG. 2). The disk 120 includes a plurality of data tracks or tracks that include a full track 251, a second full track 252 and a third full track 253.

As shown in FIG. 3, the first servo burst 210 includes individual magnetized patterns or stripes 211, 212, 213 and 214. The magnetized stripes 211, 212, 213, 214 are written on the surface of the disk 120 so that the phase of the individual stripes 211, 212, 213, 214 as written to the disk 120 advance and phase as a radial distance increases. An arrow, depicted by the reference numeral 320, shows the increasing radial distance on the disk 120. The magnetic stripes 211, 212, 213, 214 each produce an individual servo signal as a transducing head 146 (shown in FIGS. 1 and 2) flies or passes over the magnetized portion depicted by the dark magnetic stripes such as magnetic stripe 212 and then over a portion which is magnetized in an opposite direction between the stripe 212 and adjacent magnetic stripe 213. Passing through a track 251 and over the magnetic stripes 212, 213, 214 would result in three signals, for example. After sufficient filtering, the signals would appear to be approximately sinusoidal waveforms.

The second servo burst 220 includes a first magnetic stripe 221, a second magnetic stripe 222, a third magnetic stripe 223 and a fourth magnetic stripe 224. Again the dark portion of the magnetic stripe, for example, the dark portion of magnetic stripe 221 is magnetized in one direction while the open space between the first stripe 221 and the second stripe 222 of the B burst is magnetized in an opposite direction. Thus, after sufficient filtering, the second servo burst 220 will produce a signal having three approximate sinusoids from the magnetic portions 221, 222, and 223 when the transducing head 146 is passed through the track 251 while over the B burst. The servo information is used to position the transducing head 146 above a particular data track. It is desirable to fly over the center of a track such as the center 250 of data track 251. The difference in phase between the magnetic stripes and more particularly the signals that they produce in both the first phase burst 210 and the second phase burst 220 can be compared to the difference in phase between the signals produced by the first servo burst 210 and the second servo burst 220 when the transducing head 146 is flown or passed over the center line 250 of the track 251. Given a particular track number and determining the phase difference between the signals associated with the first phase servo burst 210 and the second phase servo burst 220, the position of the head can be determined and control circuitry can produce a signal to correct the position of the transducing head 146.

Also shown in FIG. 3 are example timing marks 0T, 2T, 4T... 30T. Each of the timing marks corresponds to a period of two sample times. The disk 120 rotates with respect to the transducing head 146. Given that the disk 120 rotates at a substantially constant velocity, these timing marks 0T, 2T, 4T correspond to distances on the disk. These timing marks do not physically appear on the disk 120. The timing marks correspond to time at which the signal produced by the first phase servo burst 210 and the second phase servo burst 220 will be sampled. As shown in FIG. 3, the first phase servo burst 210 and the second phase servo 220 are written in phase at the top of the figure. Thus, the pattern associated with the first phase servo burst 210 is symmetrical with respect to the second servo burst 220 about a line that corresponds to a sample time. As shown in FIG. 3, the first phase servo burst 210 and the second phase servo burst 220 are symmetrical about a line that corresponds to sample time 15T (shown as a dotted line between sample time 14T and 16T).

Figure 4:
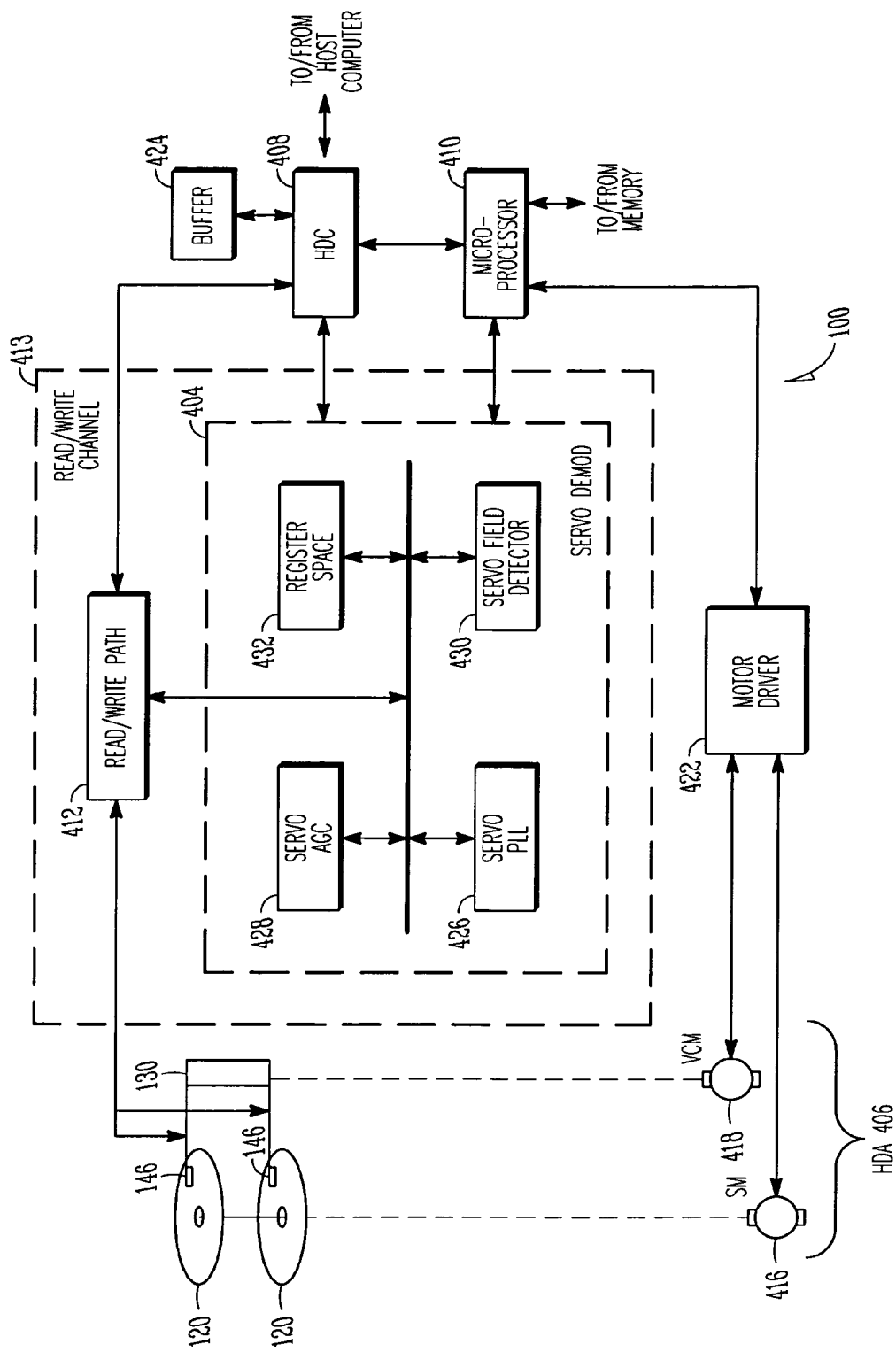
FIG. 4 is a schematic diagram of a disk drive and includes various electrical portions of the disk drive, according to an example embodiment.

The disk drive 100 not only includes many mechanical features and a disk with a servo pattern thereon, but also includes various electronics for reading signals from the disk 120 and writing information representing data to the disk 120. FIG. 4 is a schematic diagram of a disk drive 100 that more fully details some of example electronic portions of the disk drive 100, according to an example embodiment. Referring to FIG. 4, the disk drive device 402 is shown as including a head disk assembly (HDA) 406, a hard disk controller (HDC) 408, a read/write channel 413, a microprocessor 410, a motor driver 422 and a buffer 424. The read/write channel 413 is shown as including a read/write path 412 and a servo demodulator 404. The read/write path 412, which can be used to read and write user data and servo data, may include front end circuitry useful for servo demodulation. The read/write path 412 may also be used for writing servo information in self-servowriting. It should be noted that the disk drive 100 also includes other components, which are not shown because they are not necessary to explain the example embodiments.

The HDA 406 includes one or more disks 120 upon which data and servo information can be written to, or read from, by transducers or transducing heads 146. The voice coil motor (VCM) 112 moves an actuator 130 to position the transducing heads 146 on the disks 110. The motor driver 422 drives the VCM 112 and the spindle motor (SM) 416. More specifically, the microprocessor 410, using the motor driver 422, controls the VCM 112 and the actuator 130 to accurately position the heads 146 over the tracks (described with reference to FIGS. 1-3) so that reliable reading and writing of data can be achieved. The servo fields 128, discussed above in the description of FIGS. 1-3, are used for servo control to keep the heads 146 on track and to assist with identifying proper locations on the disks 120 where data is written to or read from. When reading a servo wedge 128, the transducing heads 146 act as sensors that detect the position information in the servo wedges 128, to provide feedback for proper positioning of the transducing heads 146.

The servo demodulator 404 is shown as including a servo phase locked loop (PLL) 426, a servo automatic gain control (AGC) 428, a servo field detector 430 and register space 432. The servo PLL 426, in general, is a control loop that is used to provide frequency and phase control for the one or more timing or clock circuits (not shown in FIG. 4), within the servo demodulator 404. For example, the servo PLL 426 can provide timing signals to the read/write path 412. The servo AGC 428, which includes (or drives) a variable gain amplifier, is used to keep the output of the read/write path 412 at a substantially constant level when servo wedges 128 on one of the disks 120 are being read. The servo field detector 430 is used to detect and/or demodulate the various subfields of the servo wedges 128, including the SAM 204, the track number 206, the first phase servo burst 210, and the second phase servo burst 220. The microprocessor 410 is used to perform various servo demodulation functions (e.g., decisions, comparisons, characterization and the like), and can be thought of as being part of the servo demodulator 404. In the alternative, the servo demodulator 404 can have its own microprocessor.

One or more registers (e.g., in register space 432) can be used to store appropriate servo AGC values (e.g., gain values, filter coefficients, filter accumulation paths, etc.) for when the read/write path 412 is reading servo data, and one or more registers can be used to store appropriate values (e.g., gain values, filter coefficients, filter accumulation paths, etc.) for when the read/write path 412 is reading user data. A control signal can be used to select the appropriate registers according to the current mode of the read/write path 412. The servo AGC value(s) that are stored can be dynamically updated. For example, the stored servo AGC value(s) for use when the read/write path 412 is reading servo data can be updated each time an additional servo wedge 128 is read. In this manner, the servo AGC value(s) determined for a most recently read servo wedge 128 can be the starting servo AGC value(s) when the next servo wedge 128 is read.

The read/write path 412 includes the electronic circuits used in the process of writing and reading information to and from disks 120. The microprocessor 410 can perform servo control algorithms, and thus, may be referred to as a servo controller. Alternatively, a separate microprocessor or digital signal processor (not shown) can perform servo control functions.

Figure 5:
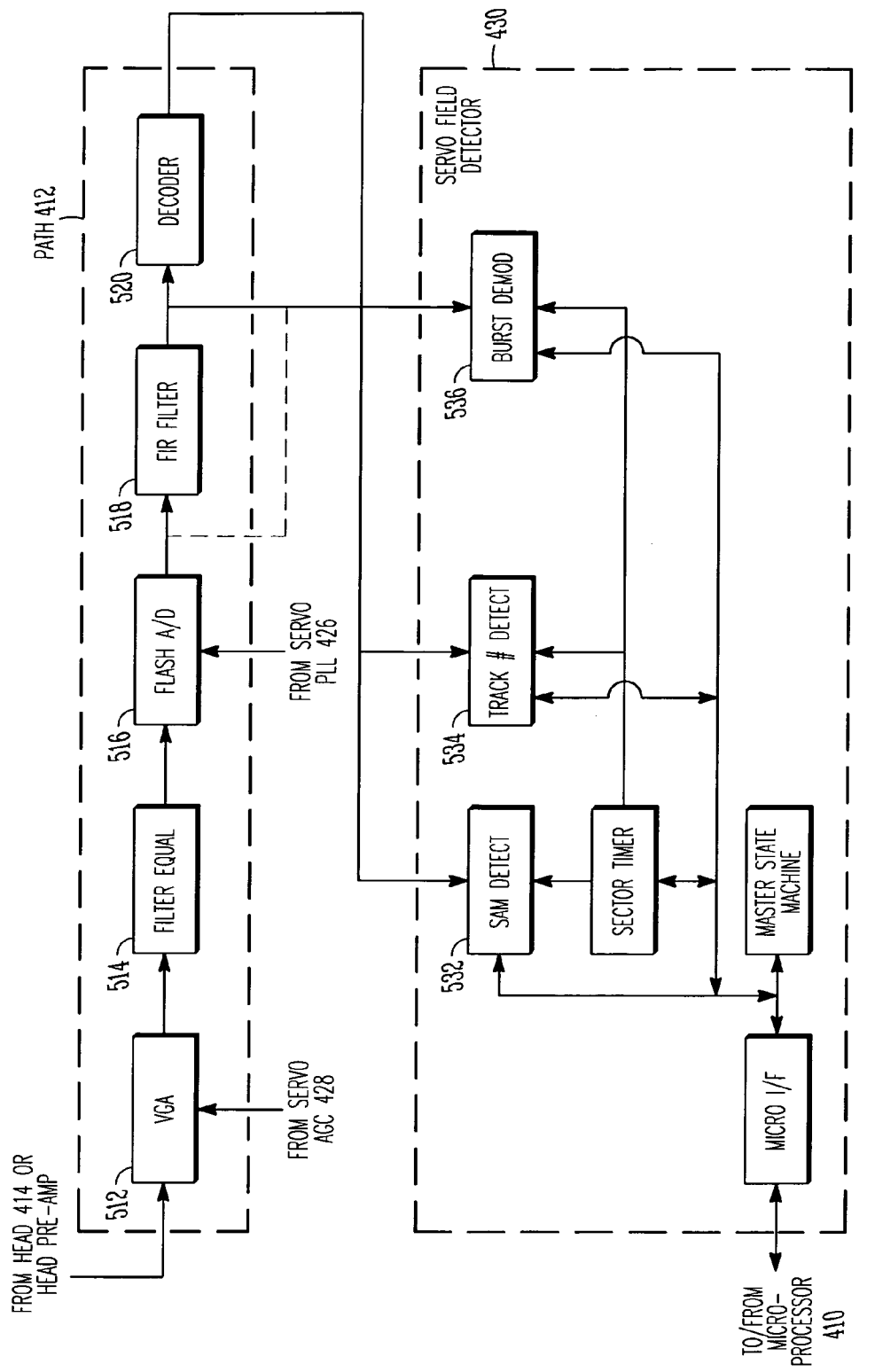
FIG. 5 is a schematic diagram showing portions of the read/write path and a servo field detector of FIG. 4, according to an example embodiment.

FIG. 5 is a schematic diagram showing portions of the read/write path 412 and the servo field detector 430 of FIG. 4, according to an example embodiment. Since the example embodiments relate to reading the servo bursts and processing the signals resulting from reading the servo bursts, the read portions of the read/write path 412 will now be further detailed. The read portion of path 412 is shown as including a variable gain amplifier (VGA) 512, which receives signals from transducing heads 146, or more likely from a pre-amplifier (not shown) driven by a signal received from transducing heads 146. In some embodiments, the VGA 512 may be external to the read/write path 412. During servo reading, the VGA 512 is at least partially controlled by the servo AGC 428. Additional amplifiers, such as buffer amplifiers and/or one or more additional VGAs may also be present. The read/write path 412 is also shown as including an analog filter/equalizer 514, a flash analog-to-digital (A/D) converter 516, a finite impulse response (FIR) filter 518 and a decoder 520. Alternatively, the FIR filter 518 can be upstream of the A/D converter 516, and FIR filtering can be performed using analog circuitry.

During servo reading, magnetic flux transitions sensed by the selected transducing head 146 are may be preamplified before being provided to the VGA 512, which controls amplification of an analog signal stream. The amplified analog signal stream is then provided to the analog filter/equalizer 514, which can be programmed to be optimized for the data transfer rate of the servo information being read by one of heads 146. The equalized analog signal is then subjected to sampling and quantization by the high speed flash A/D 516 which generates raw digital samples that are provided to the FIR filter 518. Timing for sampling can be provided by the servo PLL 426, as shown. Alternatively, sampling maybe performed asynchronously, e.g., using an asynchronous clock (in which case, most features of the present invention are still useful). The FIR filter 518 filters and conditions the raw digital samples before passing filtered digital samples to the decoder 520. The decoder 520 decodes the digital sample stream and outputs a binary signal. The servo PLL 426 can also provide other timing signals that are necessary for the path 412 and portions of the servo demodulator 404 to operate properly.

The binary signal output is provided to the servo field detector 430, and more specifically to a SAM detector 532 and a track number detector 534 of the servo field detector 430. The output of the FIR filter 518 is provided to a burst demodulator 536. Alternatively, the output of the flash A/D 516 can be provided to the burst demodulator 536. The SAM detector 532 searches for a SAM using, for example, pattern recognition logic that recognizes the SAM pattern within the binary stream. The SAM detector 532 can allow some fault or error tolerance, so that a SAM pattern will be detected even if one or more of the bits in the binary stream do not exactly match the SAM pattern. As a consequence, should minor errors occur in reading or writing the SAM patterns, it may still be possible to fully demodulate the information contained in the servo wedge 138. The track number detector 534 performs decoding of gray codes (if necessary) and detects track numbers. The burst demodulator 536 measures burst amplitudes and/or phases.

The read channel 413 reads the first servo burst 210 and the second servo burst 220. The servo signals, as read by the transducing head 146, are less than perfect sine waves. The signal stream of sine waves are sent through the VGA 512 and the analog filter/equalizer 514, which is programmed to be optimized for the data transfer rate of the servo information. The signal stream of sine waves are sampled at a selected frequency which corresponds to a sampling time, T. In the example embodiment, the servo signals are sampled at a rate of four samples per sine wave cycle. In the read channel, the flash analog-to-digital (A/D) converter 516 is used to sample the servo signals as read by the transducing head 146 (FIGS. 1 and 2). The flash analog-to-digital (A/D) converter 516 is capable of sampling millions of samples per second. Each servo burst contains multiple cycles. As shown in FIG. 2, the first servo pattern 210 includes nine cycles and the second servo burst contains eight cycles. Therefore, sampling the first burst 210 yields 36 numbers. Similarly, sampling the second burst 220 yields another 36 numbers. These samples are then sent to the FIR filter 518 which filters and conditions the raw digital samples before passing filtered digital samples to the decoder 520 and to the servo burst detector 536.

A Discrete Fourier series Transform (DFT) is done on the resultant sample series from the transducing head 146 passing over the first servo burst 210 and the second servo burst 220. The end result of the DFT on the resultant sample series includes a real part and an imaginary part. The real part and the imaginary part of the DFT can be used to characterize of the samples in terms of amplitude and phase shift. The real and imaginary parts are combined to determine the amplitude of the signal by squaring both the imaginary part and the real part, summing the two, and then taking the square root of the sum. The phase or angle of the first burst 210 can be determined by computing an arc tangent of the ratio of the real and imaginary parts. Determining the phase shift between the first servo burst 210 and the second servo burst 220 can be accomplished by determining the difference between the angle associated with the first servo burst 210 and the angle associated with the second servo burst 220. Given the phase shift between the first servo burst 210 and the second servo burst 220 and the specific track number 206 (see FIG. 2), the position of the transducing head 146 on the specific track can be determined. If the position of the transducing head 146 is not on the center of the desired track, the microprocessor 410 delivers a signal to the motor driver 422 which passes current through the VCM 418 to bring the transducing head over the track center.

In the example embodiment, the sampling rate is four samples per sine wave cycle. According to Nyquist theory, one can reject up to the Nyquist frequency of the signal by doing a DFT on a set of signal samples. The Nyquist frequency is half of the sampling rate. In the example embodiment, the Nyquist frequency is two since the sample rate per sine wave cycle is four. As a result, given a sample rate of four samples per sine wave cycle, the first harmonic can be demodulated and the second harmonic can be rejected. The third harmonic is beyond the Nyquist frequency, based upon the sample rate. Since the third harmonic and other harmonics above the third can not be properly demodulated or rejected, the third harmonic and other harmonics can introduce distortion into the resulting demodulated position.

Figure 6:
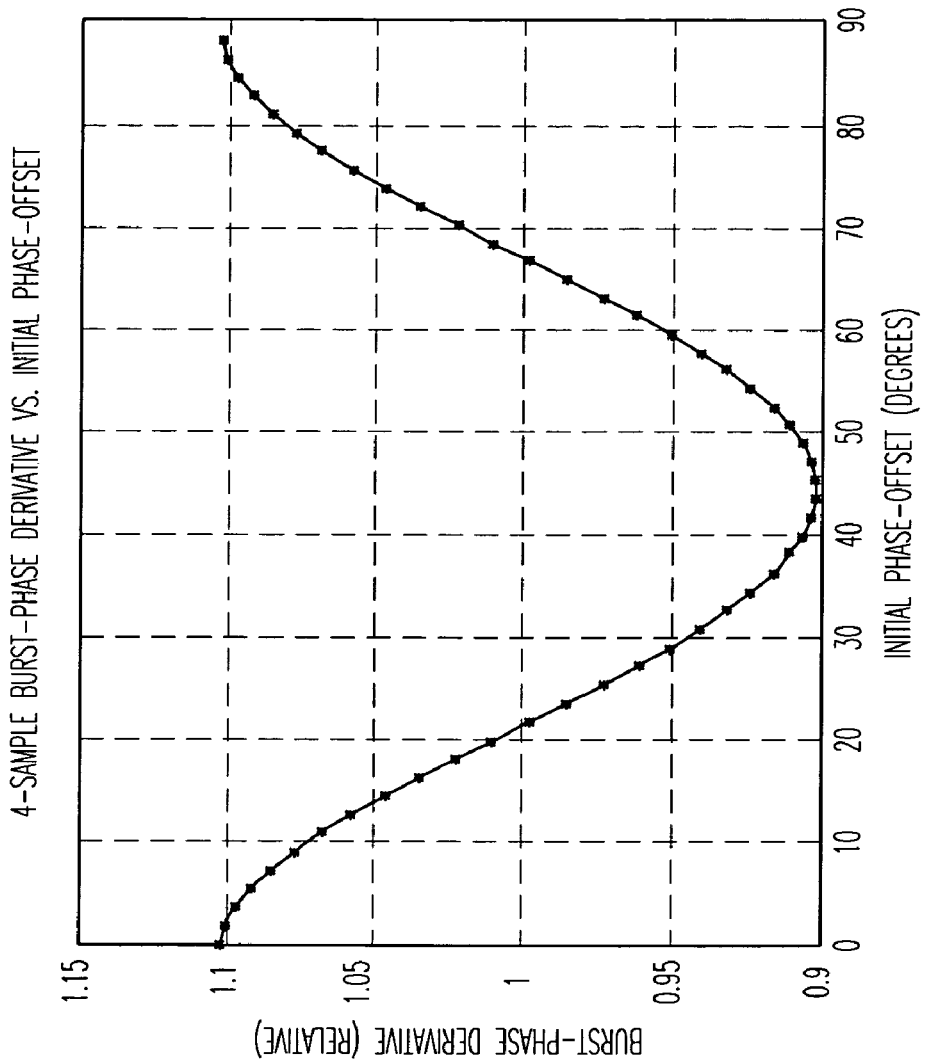
FIG. 6 is a graph showing the effective PES-gain as a function of the phase offset, according to an example embodiment.

Even small amounts of distortion in the signal will cause the gain of the PES to vary across the track or with varying radial position of the transducing head 146. In other words, as the phase offset between the first servo burst 210 the second servo burst 220 shifts, the gain also varies. FIG. 6 is a graph showing the effective PES-gain as a function of the phase offset between the first servo burst 210 and the second servo burst 220. FIG. 6 highlights the effect of distortion in the waveform generated at various phase offsets between the first servo burst 210 and the second servo burst 220. The PES-gain is highest at 0 degrees offset, when the burst-waveforms are aligned, or in phase, so that the read channel samples of the first servo burst 210, and the read channel samples of the second servo burst 220 fall on the shoulders of the respective burst signals (when the signal from the respective burst is at $+/-1/\sqrt{2}$). The PES-gain falls to a minimum value at 45 degrees offset, when the signals from the respective bursts are aligned so the read channel samples fall on the peaks, zeros, and valleys of the burst signal (when the signal form the respective burst is either at +1, −1, or 0). As an example, FIG. 6 was generated by assuming a third-harmonic distortion level of approximately 2.5% of the fundamental signal. With more or less distortion in the incoming waveform, the resulting variation in PES gain will be correspondingly more or less, although not necessarily in a linear fashion.

Thus, if one of the first servo burst 210 or the second servo burst 220 is shifted in phase by 45 degrees with respect to the other servo burst, the increases in the PES-gain contributed by the distortion due to the third harmonic of one of the first burst or the second burst is substantially canceled by the corresponding decreases in the PES-gain of the other of the burst. In one example embodiment, the disk 120 (shown in FIGS. 1 and 2) has the servo pattern 200 (as shown in FIG. 3) where the first servo burst 210 is in phase with the second servo burst 220. In this particular embodiment of the invention, a delay is introduced in the signal associated with the first servo burst 210. The delay is introduced before the first servo burst is sampled. The delay is sufficient to shift the phase of the servo burst by one half the sample time (0.5 T). This delay in sample time results in a delay of 45 degrees in the first servo burst 210. The delay also can be said to advance the second servo burst 220 by 45 degrees with respect to the first servo burst 210. This shifting of one servo burst 210 with respect to another servo burst 220 can be done in the read/write channel 413. In some embodiments, a second read/write channel may be used to introduce a delay. The result from delaying one of the servo burst signals by approximately 0.5 T is a phase offset shift between the first servo burst 210 and the second servo burst 220 of about 45 degrees. Another result from this delay is that the increase in PES-gain due to distortion introduced by the first servo burst signal is substantially cancelled by the decreases in PES-gain due to distortion introduced by the second servo burst signal.

Figure 7:
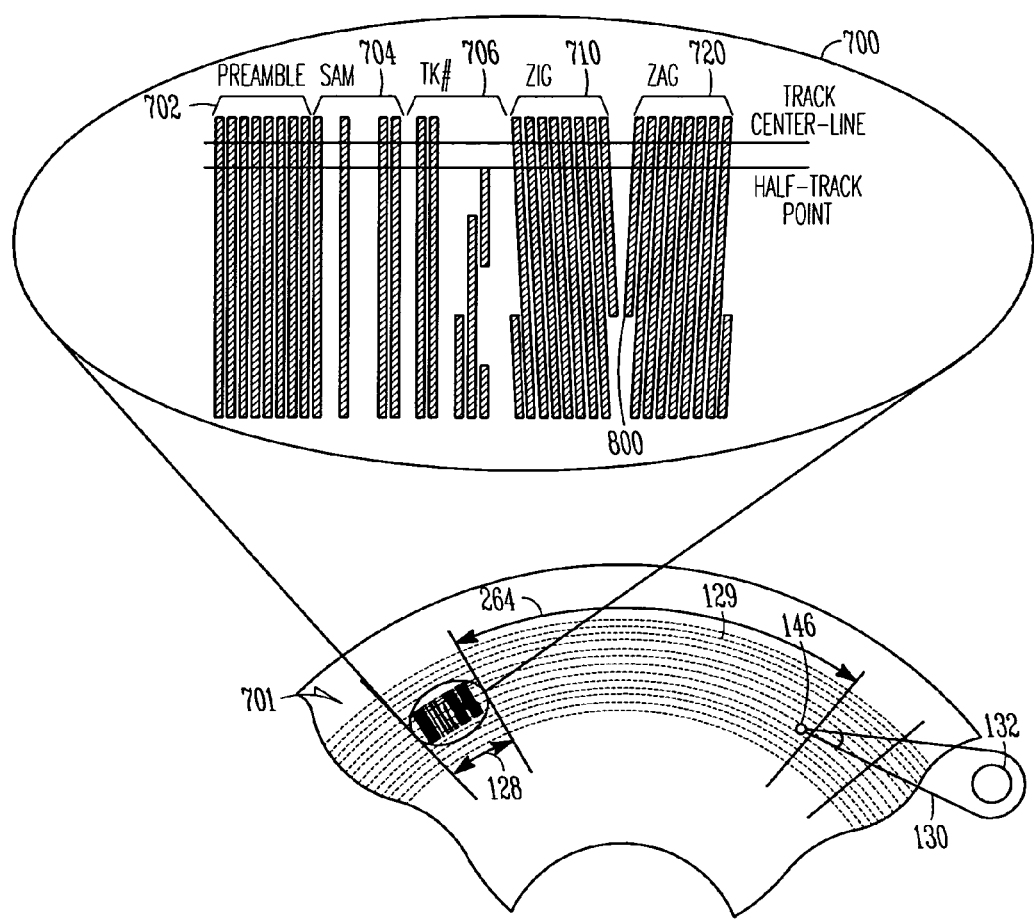
FIG. 7 is a representation of a servo signal that includes a first phase servo burst that is written out of phase with a second phase servo burst, according to an example embodiment.

FIG. 7 shows a disk 701 having a servo pattern 700 that results in another example embodiment. The servo pattern 700 can include digital information such as a preamble 702, a servo address mark (SAM) 702, a track identification number 704. The servo pattern 700 also includes a first phase burst servo pattern 710 and a second phase burst servo pattern 720 that can be used to generate a position error signal (PES) to correct deviations of the transducing head 146 with respect to the center of a track. The first phase burst 710 is written to the disk to advance in phase as the radial distance from the center of the disk 701 increases. The first phase burst 710 may also be referred to as a zig pattern or referred to as burst A. The second phase burst 720 is written to the disk 701 so that a decrease or a fall back in phase occurs as the radial distance from the center of the disk 701 increases. The second phase burst 210 referred to as a zag pattern or referred to as burst B. The magnified portion of FIG. 7 shows that the first phase servo burst 710 that is written out of phase with a second phase servo burst 720, according to another example embodiment. Specifically, the second phase servo burst 720 is advanced with respect to the first phase servo burst 710 by a distance 800 when compared to the servo signal bursts 210, 220 shown in FIG. 3. In the embodiment shown, the distance 800 (also shown in FIG. 8) on the disk corresponds to an advance of the second phase servo burst by one half of a sample time (0.5 T). In a servo system which samples at a rate of four samples per sine wave cycle, this phase shift corresponds to a 45 degree phase shift of the second servo burst 720 with respect to the first servo burst 710.

Figure 8:
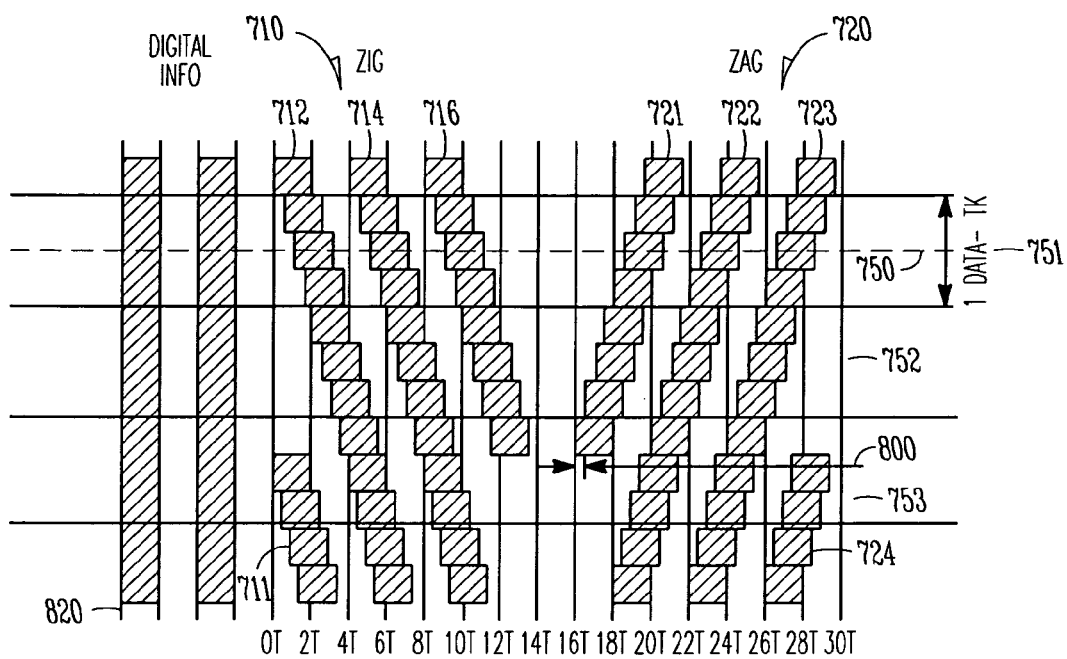
FIG. 8 is a representation of a servo signal that includes a first phase servo burst that is written out of phase with a second phase servo burst, according to an example embodiment.

FIG. 8 is a representation of a servo signal that includes the first phase servo burst 710 that is written out of phase with a second phase servo burst 720, according to an example embodiment. FIG. 8 is a close-up of the servo bursts 710, 720 of the servo pattern 710 shown in FIG. 7 and further details the position of the servo bursts 710, 720. The servo pattern is written in FIG. 8 varies slightly with respect to the servo pattern shown in FIG. 3. The main difference between the servo patterns is that the magnetic stripes 721, 722, 723, 724 associated with the second phase servo burst 720 have been advanced by a distance corresponding to a time of 0.5 T. This distance is shown on FIG. 8 and carries a reference numeral 800. In other words each portion of the second phase burst pattern 720 has been advanced by a distance corresponding to half of a time period T. In other words, the first phase servo burst pattern 710 is symmetrical to the second phase servo burst 720; however, the line of symmetry does not correspond to a sample time. The result of advancing all the elements of the second phase burst 720 by a distance corresponding to 0.5 T is that the increase in PES-gain due to distortion introduced by the first servo burst signal 710 is substantially cancelled by the decrease in PES-gain due to distortion introduced by the second servo burst signal 720.

Figure 9:
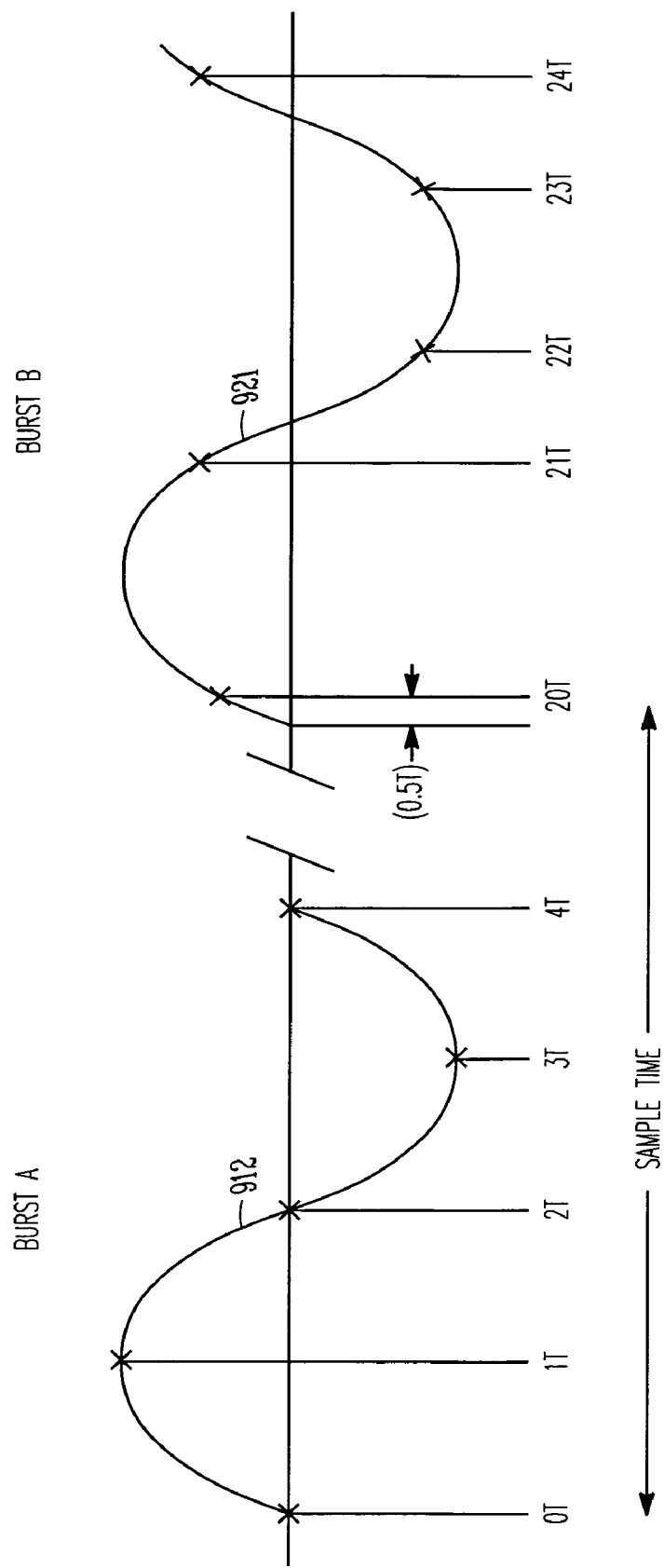
FIG. 9 is an illustration of the sampling of waveforms from burst A and burst B after one of the waveforms is shifted with respect to the other waveform.

FIG. 9 is an illustration of signal waveforms produced by burst A and burst B after burst B has been phase advanced with respect to burst A. Burst B can be phase advanced with respect to burst A either by delaying one of the burst such as burst A (mentioned above) or by writing the servo burst B or phase servo burst 720 in FIG. 8 on the disk 701 so that it is advanced in phase with respect to phase servo pattern 710. FIG. 9 shows a signal waveform associated with the top most portion of magnetic stripe 712 in FIG. 8. The burst waveform will carry the reference numeral 912. The signal waveform associated with the top portion of the magnetic stripe 721 is shown as a signal waveform 921. The signal waveform 912 associated with phase servo burst A is sampled at 0T, 1T, 2T, 3T, and 4T. For each of the sample time an "X" has been placed on the waveform 912 as shown on signal waveform 912 the samples are taken at zero crossing points, a peak (sample time 1T), and a valley (sample 3T). The signal waveform 921 associated with the phase servo burst B, is sampled at other places along the signal waveform. The signal waveform is sampled at other than the peaks, zero crossing points, and valleys of the signal waveform 921. The signal waveform 921 is sampled at the shoulders. The shoulders occur midway between a peak or a valley, and a zero crossing point. The result is that signal waveform 912 which is associated with phase servo burst A is sampled at the zero crossings, the peaks and the valleys while the phase servo burst B, represented by signal waveform 921, is sampled at the shoulders which are midway between a peak or a zero crossing.

Figure 10:
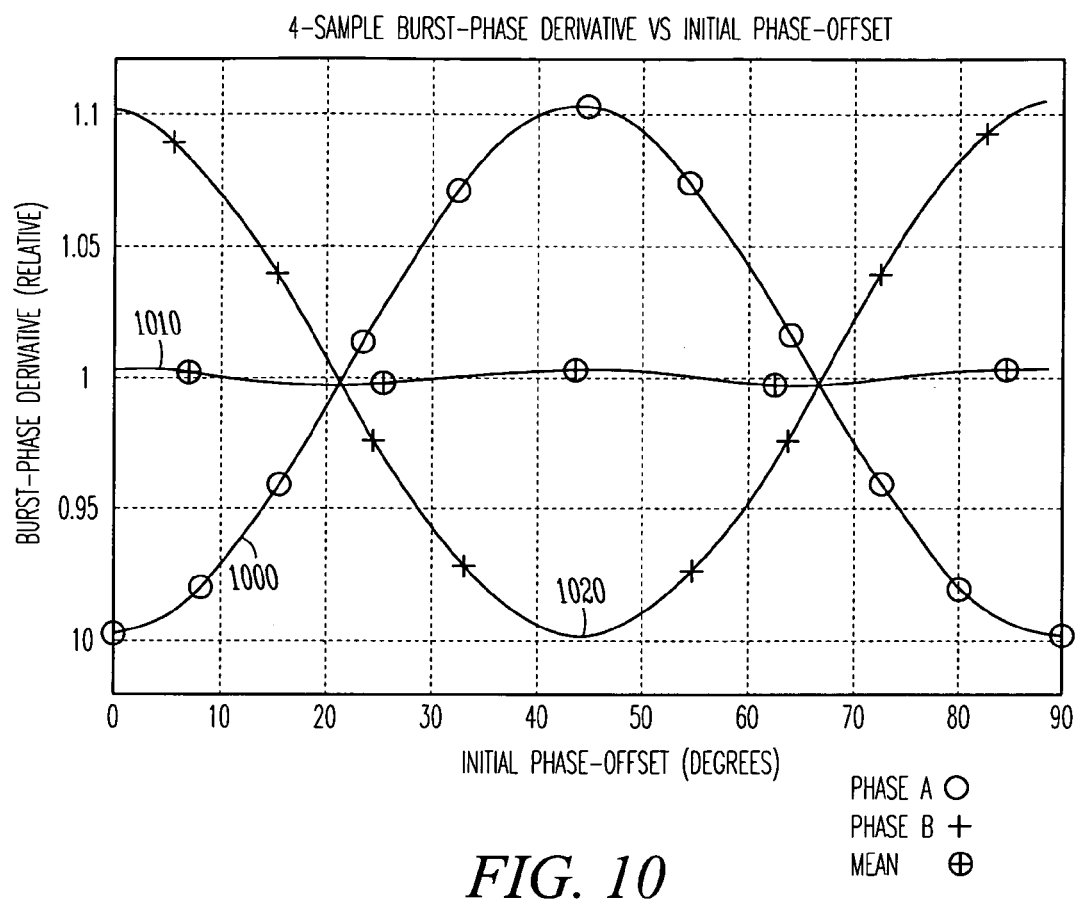
FIG. 10 is a graph showing the burst phase derivative as a function of the initial phase offset, according to an example embodiment.

FIG. 10 is a graph showing the burst phase derivative as a function of an initial phase offset, according to an example embodiment. As shown in FIG. 10, the plot of the burst phase derivative versus phase offset for phase A is depicted by sinusoidal waveform 1000 which uses circles to mark the various points on the sinusoidal waveform 1000. The burst phase derivative versus initial phase offset for phase B is depicted by the sinusoidal 1020 which is marked with plus signs. The mean of these two burst phase derivative versus initial phase offset of phase A and phase B is depicted by a curve 1010 which is marked by markers having a plus sign within a circle. The curve 1010 shows the PES-gain variation to the burst placement where one burst is offset with respect to the other burst by half a cycle time or by 45 degrees in a system with four samples per cycle servo demodulation. The peak to peak PES-gain variation that results as depicted by curve 1010, is approximately 0.5%. Other simulations show that the PES-gain variation will rise in proportion to the square harmonic distortion. Thus, if the third harmonic distortion rises from 2.5% to 5%, the PES-gain variation would rise from 0.5%, as shown in FIG. 10 to approximately 2%. As long as the third harmonic distortion is kept below 26 dB below the fundamental signal, the PES-gain variation will remain approximately 2% or less according to the example embodiments. The PES-gain variation is reduced significantly when compared to demodulating when servo burst A is in phase with servo burst B. Therefore distortion from the third harmonic is substantially reduced in the PES signal used to control the transducing head (see FIG. 1). The reduction in PES-gain variation also reduces variations in the gain of the signal used to drive the VCM 418 (see FIG. 4) by the motor driver 422. The ultimate result is that the transducing head 146 (also shown in FIG. 4) will be provided with a less distorted signal for correcting off track or off center flight over a particular track 129 on the disk 120, 701.

Figure 11:
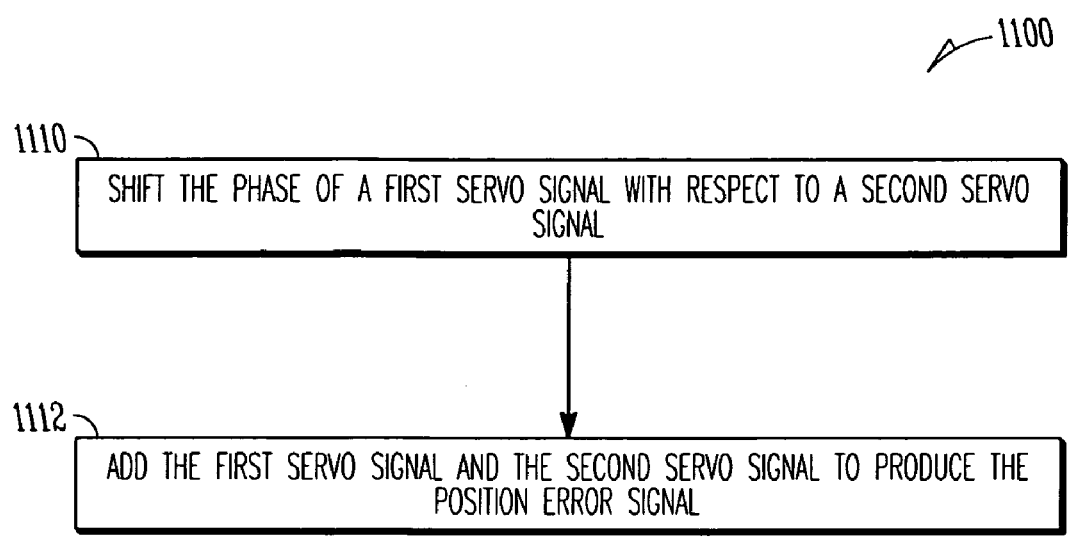
FIG. 11 is a flow diagram of a method for reducing distortion in a position error signal, according to an example embodiment.

FIG. 11 is a flow diagram of a method 1100 for reducing distortion in a position error signal, according to an example embodiment. The method 1100 for reducing distortion in a position error signal includes shifting the phase of a first servo signal with respect to a second servo signal 1110, and adding the first servo signal and the second servo signal to produce the position error signal 1112. The adding of the first servo signal and the second servo signal need not be the signal waveform as read from a servo burst but may be a signal or part of a signal waveform after signal processing on the signal waveform as read. Add, in some embodiments, includes subtracting the phase of the second servo burst from the phase of the first servo burst. The amount of phase shift between the first servo signal and the second servo signal substantially cancels a distortion in a signal produced by a first servo burst with a distortion in a signal produced by the second servo burst when the first servo signal is added to the second servo signal. In one embodiment, shifting the phase of a first servo signal with respect to a second servo signal 1110 includes writing one of the first servo burst 710 and the second servo 720 shifted by a distance on a media related to a portion of a sample time used to sample a servo signal. In another embodiment, shifting the phase of a first servo signal with respect to a second servo signal 1110 includes delaying the phase of one of the first servo signal 210 and the second servo signal 220 from the phase of the other of the first servo signal and second servo signal in a read channel.

The example embodiments include a media 701 includes a plurality of tracks, a first servo burst 710 written with advancing phase as a distance on the media transverse to the plurality of tracks increases, and a second servo burst 720 written with decreasing phase as a distance on the media transverse to the plurality of tracks increases. The phase of one of the first servo burst 710 and the second servo burst 720 is offset from the phase of the other of the first servo burst 710 and second servo burst 720 by an amount sufficient to substantially cancel distortion in a signal produced by the first servo burst 710 with distortion in a signal produced by the second servo burst 720 when the signal from the first servo burst 710 is added to the signal from the second servo burst 720. The signal is not necessarily the signal as read and may be the result after signal processing. In addition the media 120, 820 is not limited to a magnetic disk. The media could be an optical disk, a tape or any other type of media that may need or use servo information as part of a control finisher. In one embodiment, the first servo burst 710 is offset in phase from the second servo burst 720 by writing one of the first servo burst 710 or the second servo burst 720 patterns on the media 701 shifted by a distance 800 on the media related to a portion of a sample time used to sample a servo signal. In one embodiment the amount of phase shift corresponds to about one half of a sample time used to sample the servo burst signal. The distortion, in one embodiment, is related to a harmonic of the signal produced by the first servo burst 710 and a harmonic of the signal produced by the second servo burst 720. In one embodiment, the distortion is related to a third harmonic of the signal produced by the first servo burst 710 and a third harmonic of the signal produced by the second servo burst 720 where the signal from the first servo burst 710 and the signal from the second servo burst 720 is sampled at a rate of four times per sinewave-cycle. In one embodiment, the first servo burst 710 and the second servo bursts 720 are phase bursts and the media is a disk.

The example embodiments include a disk drive 100 includes a disk further including a plurality of tracks 129, a first servo burst 210, 710 written with advancing phase as a radial distance on the disk increases in a direction, and a second servo burst 220, 720 written with decreasing phase as a radial distance on the disk increases, a transducing head 146 for reading information from the disk 120, 701, and a read channel 413. The read channel 413 handles information from the disk 120, 701 including the first servo burst 210, 710 and the second servo burst 220, 720. The disk drive 100 also includes an element for shifting the phase of the signal produced by the first burst pattern 210, 710 with respect to the signal produced by the second burst pattern 220, 720 by an amount sufficient to substantially cancel distortion in a signal produced by the first servo burst 210, 710 with distortion in a signal produced by the second servo burst 220, 720 when the signal from the first servo burst 210, 710 is added to the signal from the second servo burst 220, 720. In one example embodiment, the element for shifting phase is a disk 701 written with the phase of the first servo burst offset 710 from the phase of second servo burst 720. In another embodiment, the element for shifting phase is a delay element in the read channel 413, the delay element shifting the phase of one of the first servo burst 210 and the second servo burst 220 from the phase of the other of the first servo burst 210 and second servo burst 220.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A media comprising:
a plurality of tracks;
a first servo burst written with advancing phase as a distance on the media transverse to the plurality of tracks increases; and
a second servo burst written with decreasing phase as a distance on the media transverse to the plurality of tracks increases, wherein the phase of one of the first servo burst and the second servo burst is offset from the phase of the other of the first servo burst and second servo burst with respect to a predetermined sample time by an amount sufficient to substantially reduce distortion in a signal produced by the first servo burst with distortion in a signal produced by the second servo burst when a component of the signal from the first servo burst is added to a component of the signal from the second servo burst.

2. The media of claim 1 wherein one of the first servo burst is offset in phase from the second servo burst by writing one of the first servo burst or the second servo burst patterns on the media shifted by a distance on the media related to a portion of a sample time used to sample a servo signal.

3. The media of claim 1 wherein the distortion is related to a harmonic of the signal produced by the first servo burst and a harmonic of the signal produced by the second servo burst.

4. The media of claim 1 wherein one of the first servo burst is offset in phase from the second servo burst by writing one of the first servo burst or the second servo burst patterns on the media shifted by a distance on the disk related to about one half of a sample time used to sample the servo burst signal.

5. The media of claim 4 wherein the distortion is related to a third harmonic of the signal produced by the first servo burst and a third harmonic of the signal produced by the second servo burst.

6. The media of claim 4 wherein the signal from the first servo burst and the signal from the second servo burst is sampled at a rate of four times per sine wave cycle.

7. A disk drive comprising:
a disk further including:
a plurality of tracks;
a first servo burst written with advancing phase as a radial distance on the disk increases in a direction; and
a second servo burst written with decreasing phase as a radial distance on the disk increases;
a transducing head to read information from the disk; and
a read channel to read information from the disk, the information including the first servo burst and the second servo burst; and
a phase shifter to shift the phase of the signal produced by the first burst pattern with respect to the signal produced by the second burst pattern at a predetermined sample time by an amount sufficient to substantially reduce distortion in a signal produced by the first servo burst with distortion in a signal produced by the second servo burst when a component of the signal from the first servo burst is added to a component of the signal from the second servo burst.

8. The disk drive of claim 7 wherein the phase shifter is a disk written with the phase of one of the first servo burst and the second servo burst offset from the phase of the other of the first servo burst and second servo burst.

9. The disk drive of claim 8 wherein one of the first servo burst is offset in phase from the second servo burst by writing one of the first servo burst or the second servo burst on the disk shifted by a distance on the disk related to a portion of a sample time used to sample a servo signal.

10. The disk drive of claim 8 wherein one of the first servo burst is offset in phase from the second servo burst by writing one of the first servo burst or the second servo burst patterns on the media shifted by a distance on the disk related to about one half of a sample time used to sample the servo burst signal.

11. The disk drive of claim 7 wherein the distortion is related to a harmonic of the signal produced by the first servo burst and a harmonic of the signal produced by the second servo burst.

12. The disk drive of claim 11 wherein the distortion is related to a third harmonic of the signal produced by the first servo burst and a third harmonic of the signal produced by the second servo burst.

13. The disk drive of claim 11 wherein the signal from the first servo burst and the signal from the second servo burst is sampled at a rate of four times per sinewave-cycle.

14. The disk drive of claim 7 wherein adding the signal from the first servo burst and the signal from the second servo burst produces a position error signal used to control the position of the transducing head with respect to one of the plurality of tracks.

15. A method for reducing distortion in a position error signal comprising:
shifting the phase of a first servo signal with respect to a second servo signal with respect to a predetermined sample time; and
adding a component of the first servo signal and a component of the second servo signal to produce the position error signal, wherein the amount of phase shift between the first servo signal and the second servo signal substantially cancels a distortion in a signal produced by a first servo burst with a distortion in a signal produced by the second servo burst when the component of the first servo signal is added to the component of the second servo signal.

16. The method of claim 15 wherein shifting the phase of a first servo signal with respect to a second servo signal includes writing one of the first servo burst and the second servo shifted by a distance on a media related to a portion of a sample time used to sample a servo signal.

* * * * *